United States Patent [19]

Lassally

[11] Patent Number: 4,928,923
[45] Date of Patent: May 29, 1990

[54] FLANGED VALVE

[75] Inventor: Gunter M. Lassally, Amsterdam, Netherlands

[73] Assignee: Amstelstaal B.V., Amsterdam, Netherlands

[21] Appl. No.: 704,304

[22] Filed: Feb. 21, 1985

[30] Foreign Application Priority Data

Feb. 28, 1984 [NL] Netherlands .......................... 8400607

[51] Int. Cl.$^5$ ............................................ F16K 31/44
[52] U.S. Cl. ........................................ 251/221; 251/367
[58] Field of Search ...................... 251/221, 225, 367

[56] References Cited

U.S. PATENT DOCUMENTS

| 189,904 | 4/1877 | Rebasz | 251/221 |
| 191,500 | 5/1877 | Wiegond | 251/225 |
| 1,774,994 | 9/1930 | Pfoutz | 251/255 |
| 3,589,387 | 6/1971 | Raymond | 251/367 |
| 3,910,553 | 10/1975 | Boylon | 251/225 |

Primary Examiner—A. Michael Chambers
Attorney, Agent, or Firm—Lorusso & Loud

[57] ABSTRACT

A flanged valve comprising a valve box having a substantially axially extending channel formed therein, said channel at one side being adapted to be connected to a supply line and at the other side to a discharge line, while a valve means that is positioned in the valve box can shut-off the channel passage entirely or partially, and the valve box comprises means for mounting the valve box between the supply line and the discharge line, said means existing of passing-through bores through which mounting bolts can extend. In a preferred embodiment the valve box substantially forms a cylindrical flange that can have such dimensions that the valve means and its operating mechanism are positioned entirely within the valve box.

8 Claims, 1 Drawing Sheet

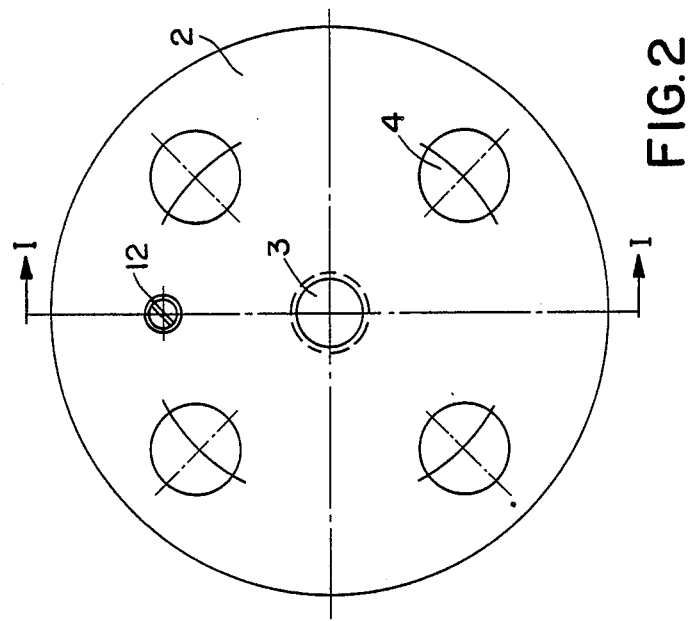
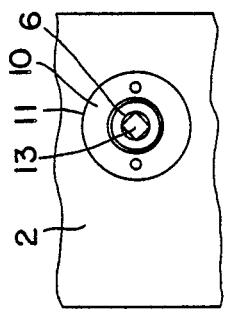
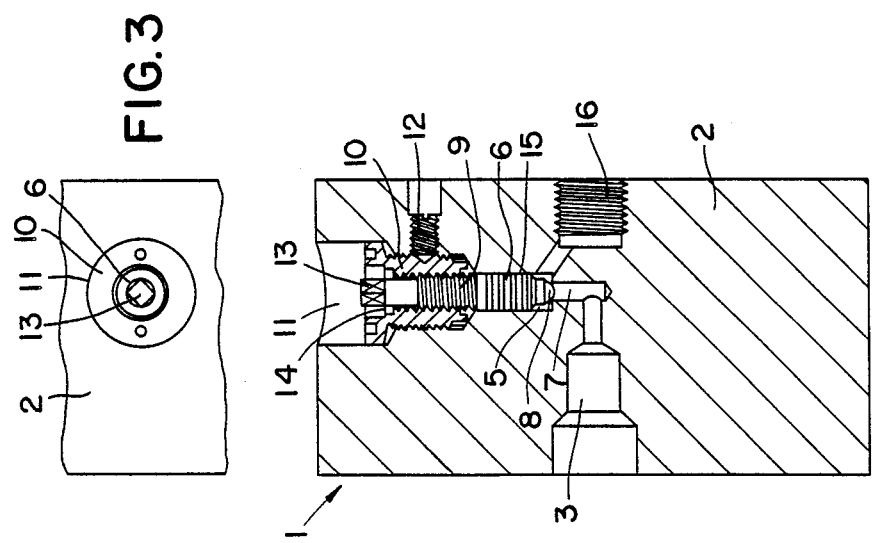

FLANGED VALVE

The invention relates to a flanged valve comprising a valve box having a substantially axially extending channel formed therein, said channel at one side being adapted to be connected to a supply line and at the other side to a discharge line, a valve means positioned in the valve box to shut-off the channel passage entirely or partially, the valve box further comprising means for mounting the valve box between the supply line and the discharge line.

A known flanged valve of the type referred to above comprises flanges at the side of the supply line for connecting the valve to these lines. Moreover, it is often usual to provide a reducing flange at the discharge side of the valve.

Due to this rather complicated shape this known flanged valve has a great length, while forming the connections between the valve and the supply line and the discharge line, respectively, is fairly time-consuming.

It is an object of the invention to provide a flanged valve of the type referred to above not having the mentioned drawbacks.

The flanged valve according to the invention therefore is characterized in that the valve box is provided with passing-through bores through which mounting bolts can extend.

As a result the flanged valve no longer comprises flanges at its supply side and its discharge side, but the valve box as it were itself functions as a flange. This results in a valve that in its totality is shorter than the known valve with its flanges. Moreover, the establishment of the connections between the valve and the supply line and the discharge line, respectively, will be less time-consuming compared to the known valve, while nevertheless a safe connection will be formed.

A preferred embodiment of the invention is characterized in that the valve box substantially forms a cylindrical flange that has one side adapted to be connected to an end of a line comprising a flange and the other side being adapted to be connected to an end of a line comprising a thread.

In this embodiment of the valve according to the invention the handling thereof is extremely simple.

An advantgeous embodiment of the flanged valve according to the invention is characterized in that the dimensions of the flange-shaped valve box are such that the valve means and its operating mechanism are positioned entirely within the valve box.

As a result the risk of damaging the valve means and its operating mechanism is avoided, because these parts are positioned entirely within the limits of the valve box and because there are no extending parts. Moreover, during handling the valve box has not to be lifted but can be rolled over the ground.

A still further preferred embodiment of the flanged valve according to the invention is characterized in that at the side of the discharge line the channel comprises an internal thread for connecting the discharge line.

This internal thread permits a discharge line comprising corresponding external thread to be threaded into the valve without the need for a reducing flange.

The invention will be explained further in connection with the drawing that shows an embodiment of the flanged valve according to the invention.

FIG. 1 is a cross-sectional view of an embodiment of the flanged valve according to the invention;

FIG. 2 is a side elevational view of the flanged valve of FIG. 1;

FIG. 3 is a partial top view of the flanged valve of FIG. 1.

The flanged valve 1 comprises a cylindrical valve box 2 forming as it were a flange and in which a channel 3 extends substantially axially, said channel 3 at one side being connectable to a supply line and aat the other side to a discharge line. The valve box 2 comprises a number of passing-through bores 4, through which mounting bolts can be passed for mounting the valve 1 between the supply line and the discharge line. For this reason these lines generally comprise flanges having bores that in the mounted position are aligned with the bores 4 of the valve box 2. The bores 4 extend in parallel with the axis of the cylindrical valve box 2.

In a hole 5 in the valve box 2 forming an elongation of the channel part 7 of the channel 3, a screw spindle 6 is adjustably positioned, said screw spindle 6 acting as a valve means for said channel part 7 of the channel 3. For this purpose the screw spindle 6 at its lower end is provided with a sealing head 8 that can entirely or partialy shut-off the channel part 7.

The thread 9 of the screw spindle 6 engages an inner thread of a lid 10 that is detachably mounted in an enlarged portion 11 of said hole 5 in the valve box 2. In order to prevent the lid 10 from rotating during turning the screw spindle 6, said lid can be secured to the valve box 2 through a locking means 12.

As appears from FIG. 1, the screw spindle 6 is entirely positioned within the valve box 2. For the operation of the screw spindle 6 its upper end is positioned in a recessed portion of the upper side of the lid 10, said upper end comprising a connecting stub 13 for a corresponding operation means for the screw spindle 6. As a result it is avoided that unauthorized persons can open and close the valve 2, because for this a special operating means corresponding with the connecting stub 13 is necessary.

Above the thread 9 of the screw spindle 6 a sealing ring 14 is positioned between the lid 10 and the screw spindle 6, said sealing ring 14 being provided for sealing against dust and so on. Moreover, a number of sealing rings 15 are positioned below the thread 9 of the screw spindle 6 between the wall of the hole 5 and the screw spindle 6, said sealing rings 15 together with the screw spindle 6 forming a seal between the enlarged portion 11 of the hole 5 and the channel 3.

The channel 3 comprises at the discharge side an internal thread 16, that is adapted to be connected to a discharge line.

The invention is not restricted to the embodiment shown in the drawing, but can be varied widely within the scope of the invention.

I claim:

1. A flanged valve comprising:
    a valve box having a substantially axially extending channel formed therein, said channel at one side being adapted to be connected to a supply line and at the other side to a discharge line, the valve box substantially forming a cylindrical flange that has one side adapted to be connected to an end of a line comprising a flange and the other side being adapted to be connected to an end of a line comprising a thread, a valve means and associated operating mechanism positioned entirely within the valve box to shut-off the channel entirely or partially, means for mounting the valve box between the supply line and the discharge line, said mounting means including passing through bores through which mounting bolts can extend.

2. The flanged valve according to claim 1 wherein said valve means comprises a spindle that is adjustable in a hole forming an elongation of a portion of the channel, the lower end of the spindle being adapted to shut-off this channel portion entirely or partially.

3. The flanged valve according to claim 2, wherein said spindle is a screw spindle that is threadably mounted in a lid disposed in an enlarged portion of the hole.

4. The flanged valve according to claim 3, wherein said lid is detachably positioned in the hole in that valve box and can be secured by a locking means.

5. The flanged valve according to claim 3, wherein the upper end of the screw spindle is positioned in a recessed portion of the upper side of the valve box and is provided with a connecting stub for a corresponding operating means for the screw spindle.

6. The flanged valve according to claim 3, further comprising at least one sealing element positioned below the thread of the screw spindle between the screw spindle and the wall of the hole in the valve box.

7. The flanged valve according to claim 3, further comprising at least one sealing element positioned above the thread of the screw spindle between the lid and the screw spindle.

8. The flanged valve according to any one of the preceding claims, wherein at the side of the discharge line the channel comprises an internal thread for connecting the discharge line.

* * * * *